Aug. 7, 1951 M. WATTER 2,563,629
VERTICALLY SWINGING ADJUSTABLE LEG AND FOOT REST
Filed April 19, 1946 4 Sheets-Sheet 1
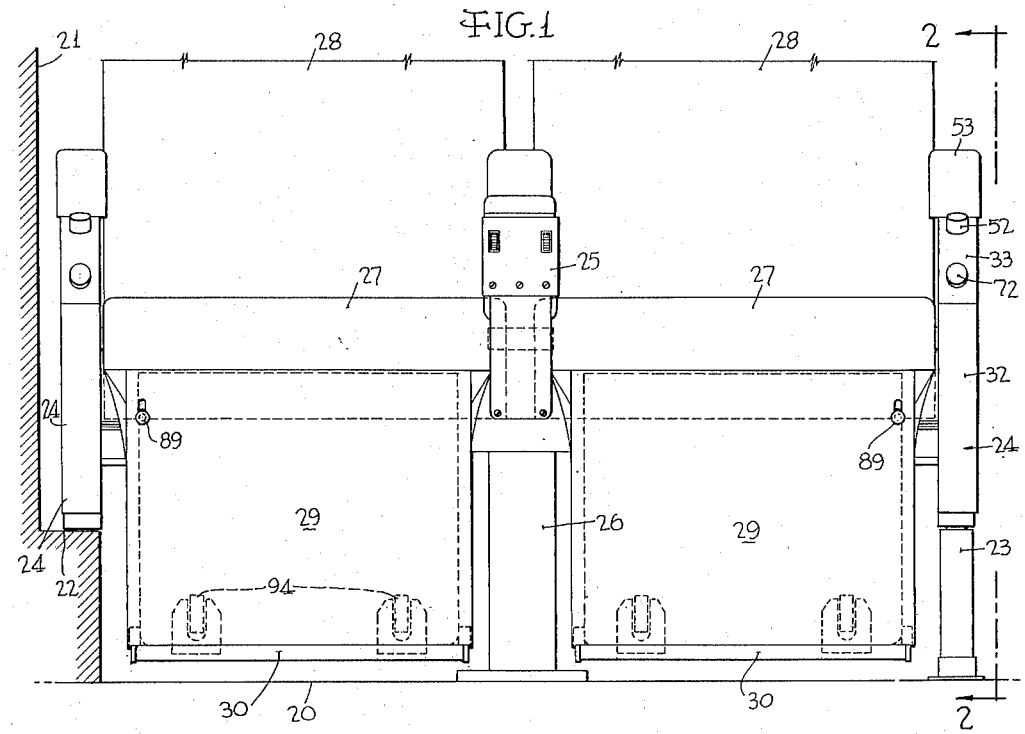
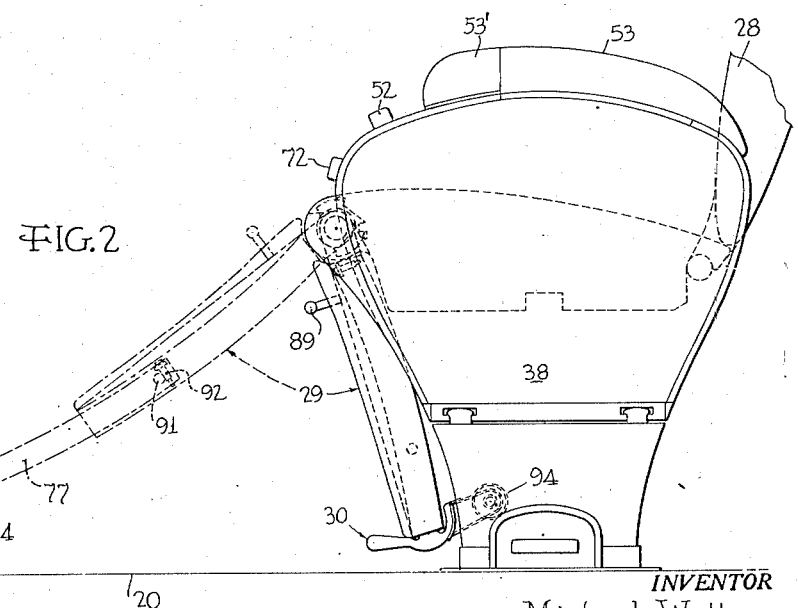
INVENTOR
Michael Watter.
BY
ATTORNEY Aug. 7, 1951          M. WATTER          2,563,629
VERTICALLY SWINGING ADJUSTABLE LEG AND FOOT REST
Filed April 19, 1946          4 Sheets-Sheet 2
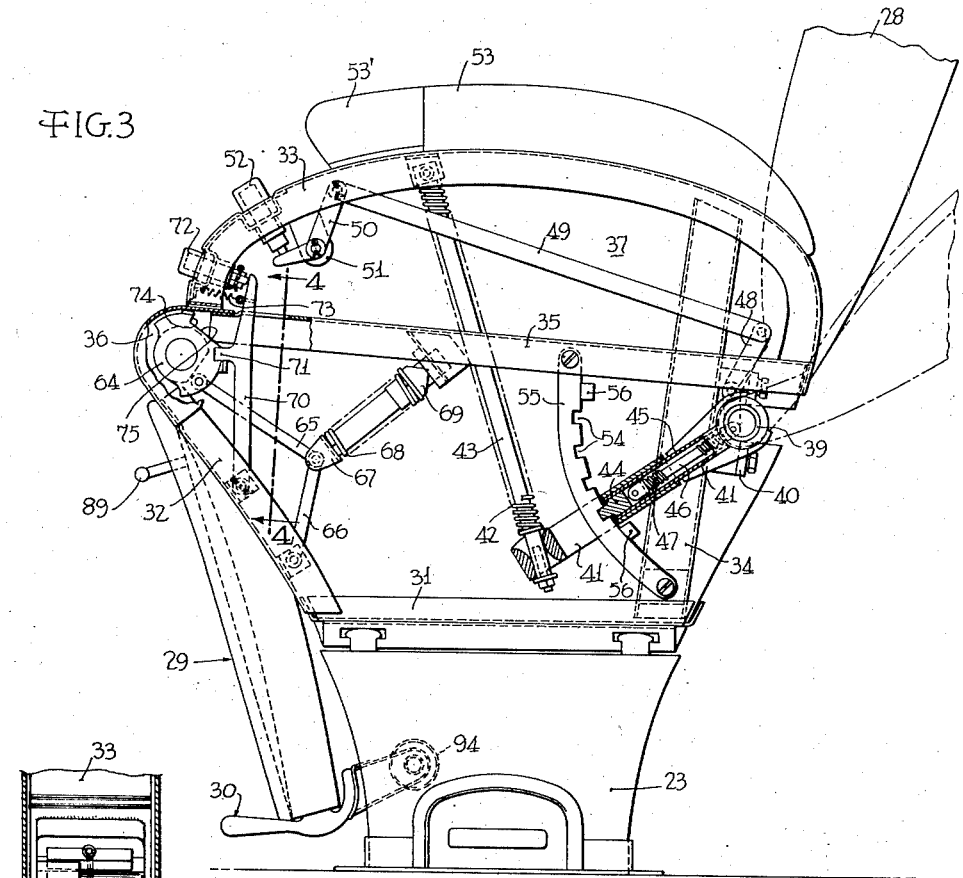
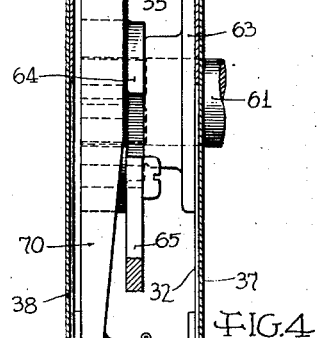
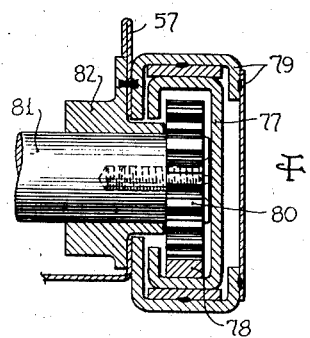
INVENTOR
Michael Watter
BY
*Donald B. Waite*
ATTORNEY

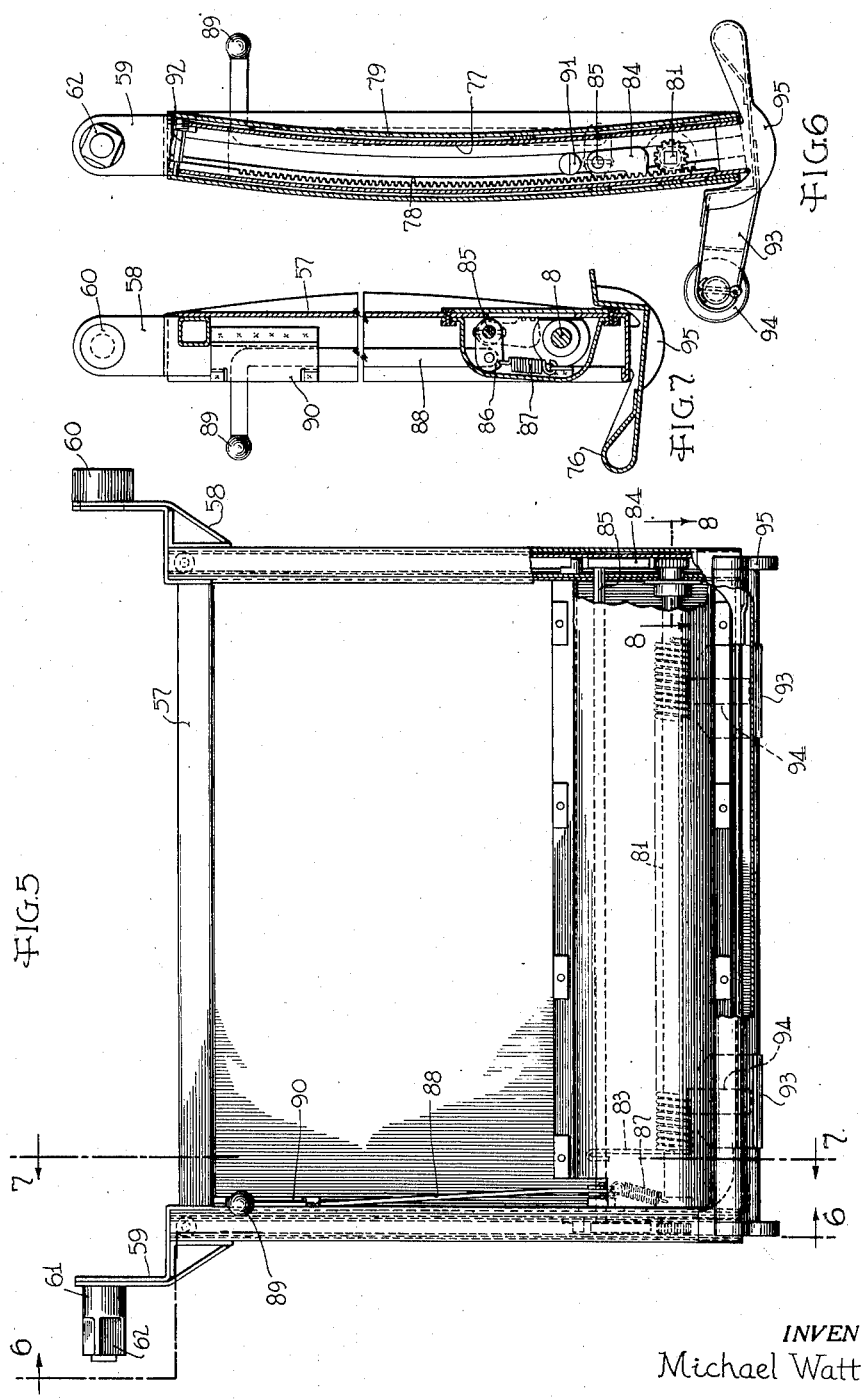

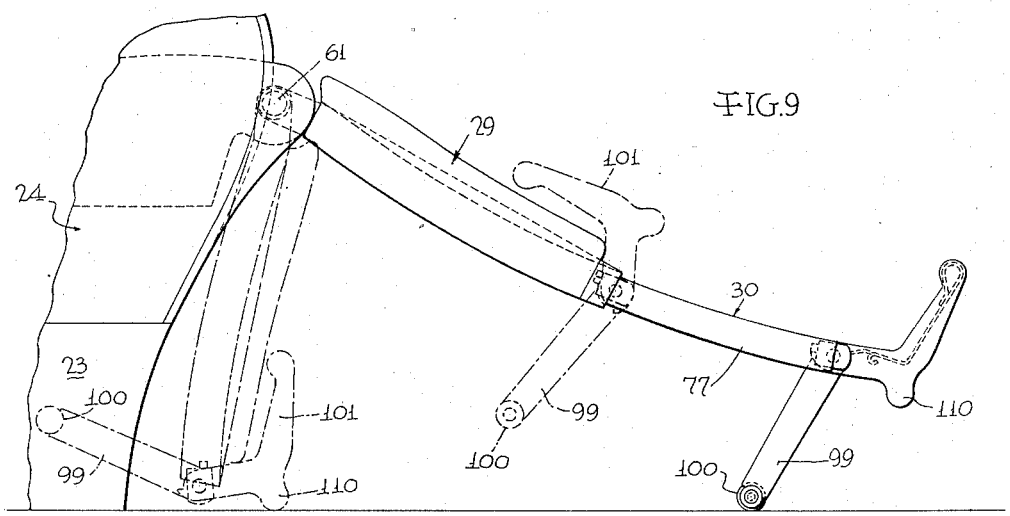

Patented Aug. 7, 1951

2,563,629

UNITED STATES PATENT OFFICE 2,563,629

VERTICALLY SWINGING ADJUSTABLE LEG AND FOOT REST

Michael Watter, Philadelphia, Pa., assignor, by mesne assignments, to Heywood-Wakefield Company, Gardner, Mass., a corporation of Massachusetts Application April 19, 1946, Serial No. 663,543

2 Claims. (Cl. 155—171)

The invention refers to a seat, especially a vehicle seat of the reclining type, having a swingable leg rest and an extensible foot rest attached thereto. More specifically, the invention refers to modifications in the types of seats forming the subject matter of applicant's application Serial No. 631,131, filed November 27, 1945, on "Reclining Seat for Vehicles, Especially Railway Cars," and disclosed in the application of John C. Lyon, Serial No. 631,124, filed November 27, 1945, on "Reclining Seat, Especially for Railway Cars," now Patent No. 2,559,127, granted July 3, 1951.

Among the objects of the invention is a seat of the indicated type in which the leg and/or foot rest, although of light-weight construction, will not be damaged by persons who try to sit or step on them and thereby put their whole weight thereon, or by persons who put heavy pieces of luggage on the leg or foot rest.

The aforesaid and other objects of the invention, which will become apparent as the description progresses, are achieved by a connection between the leg rest and the seat supporting structure which yieldingly gives way if excessive load is put on the leg rest so that the leg rest comes into contact with the floor and is supported thereby.

Another feature of the invention consists in providing the leg rest, or the foot rest forming a part thereof, with extensions, preferably provided with wheels or a roller, which permit the leg and/or foot rest to move along the floor without offering undue resistance and without damaging the floor covering.

The objects and advantages of the invention, as well as all its features, will be more easily and fully understood from the following description of the several embodiments illustrated in the attached drawing.

In the drawing:

Figure 1 is a diagrammatic and front elevation of a double vehicle seat with the adjoining wall and floor portions of the vehicle indicated in section;

Figure 2 is a side elevation of the seat viewed in the direction of the arrows 2—2 of Figure 1;

Figure 3 is a view corresponding to Figure 2 but on a larger scale and with the cover plate for the end wall removed to expose the mechanism for the leg rest and the reclining back rest;

Figure 4 is a fragmentary section on a still larger scale taken along line 4—4 of Figure 3 and showing the details of the mechanism for tilting the leg rest;

Figure 5 is a front elevation of one of the leg-and-foot rests shown in Figure 1 but on a larger scale and with the upholstery removed to expose the underlying mechanism;

Figures 6 and 7 are sectional views along lines 6—6 and 7—7 respectively of Figure 5 viewed in the direction of the arrows of the section lines;

Figure 8 is a fragmentary section through part of the operating mechanism for the foot rest along line 8—8 of Figure 5 but on a substantially larger scale;

Figure 9 is a fragmentary, diagrammatic, side elevation of a slightly modified embodiment with the leg-and-foot rest shown in different positions, the different positions being indicated respectively by full lines and dot-and-dash lines;

Figure 10 is a fragmentary top view, partly in section, of the outer end of the foot rest shown in Figure 9 but on a substantially larger scale; and Figure 11 is a fragmentary section along line 11—11 of Figure 4.

In the embodiment illustrated in Figures 1 through 8, the floor 20 is adjoined by an upright wall 21 provided along its lower portion with a ledge 22 which may be formed by the customary heater duct. The ledge 22 together with a support 23 arranged along the aisle of the vehicle carries the end walls 24 of the seat frame structure, the middle portion of which is provided with a central arm rest 25 and rests on a column 26. The end walls 24 releasably engage the structures 22 and 23 and the entire structure is rotatable about the column 26, as more fully described in the above-mentioned applications and in the application of John C. Lyon, Serial No. 631,125, filed November 27, 1945, on "Revolving Seat, Especially for Railway Cars," now abandoned. The seat frame structure carries the body-supporting means in the form of seat cushions 27, the back rests 28 and the leg rests 29, which latter are provided with extensible foot rests 30. This general arrangement is substantially identical with the construction disclosed in the above applications and requires no description or showing in detail.

The end walls 24 have a supporting framework comprising a lower member 31, a front member 32, a curved top member 33, an upright rear member 34, an intermediate generally horizontal member 35, and a forward bracket member 36 interconnecting the meeting ends of the members 32, 33 and 35. This framework is covered on both sides by cover panels 37, 38 at least one of which is easily removable to give access to the mechanism in the space between the panels 37, 38, which mechanism will now be described. The frame members are integrally connected with each other and also, preferably, with one of the cover panels and the supporting structure (not shown) for the seat cushions 27, which structure integrally interconnects the end walls 24 and the intermediate arm rest structure 25.

It will be understood that each end structure 24 contains a mechanism of the type so far described for its individual adjoining back rest and also a mechanism for supporting and operating the adjoining leg rest. Therefore, it will not detract from the understanding of the construction that Figures 3 and 4 show the mechanism for the leg-and-foot rest on the right-hand side of Figure 1, whereas Figures 5 through 8 show the leg-and-foot rest on the left-hand side of Figure 1.

Each of the leg rests 29 has a supporting structure 57 to which are secured brackets 58 and 59 each carrying a stub shaft 60 and 61 respectively. The cylindrical shaft 60 is freely rotatably supported in a bearing of the adjoining central arm rest structure 25, this support not being shown as substantially identical with the support illustrated in the above earlier applications, while the stub shaft 61 has a squared end 62, is rotatably supported in a bearing 63 secured to the bracket member 36 in the adjoining end wall 24 and carrying on its squared portion 62 a cam disc 64.

Journalled to the disc 64 is a link 65 which has its other end journalled to a second link 66 and a spring shoe 67. The second end of the link 66 is journalled to the frame member 32 and the spring shoe engages a compression spring 68 inserted between it and a second shoe 69 acting upon a bracket of frame member 35. Obviously, the spring 68 endeavors to swing leg rest 29 forwardly and upwardly by means of the linkage system 66, 65, the disc 64 and the shaft 62, 61.

The leg rest is held in its lowered position by a lever 70 having its lower end journalled to the frame member 32 and engaging by a tooth 71 a corresponding straight sided notch of the disc 64. The upper end of the lever 70 is engaged by a second push button 72 and is biased by a spring 73. Initial movement of the button 72 causes disengagement of the tooth 71 from the notch of the disc 74 and allows upward swinging of the leg rest under the action of the spring 68 until the tooth 71 engages the radially projecting wall 74 of a second notch, the other wall 75 of which extends about tangentially to the axis of the shaft 61.

It is mainly in respect to the notch defined by the walls 74 and 75 that the leg rest operating mechanism of the instant invention differs from the corresponding mechanism of the aforesaid applications. Though this difference may appear small, it has an important purpose and serves for achieving one of the aims of the invention.

If the leg rest is raised into the upwardly and forwardly inclined position, that is, beyond the position indicated by dot-and-dash lines in Figure 2, then the tooth 71 engages wall 74 of the disc 64 and the leg rest is held in this position. If, in this position, excessive weight is placed on the leg rest, the leg rest is not positively held in the raised position by its engagement with tooth 71 but may fold down against the action of the spring 68 and against the action of the lever 70 and its spring 73 because the tooth 71 is pushed backward by the surface 75 which has the effect of an inclined surface. Unless the leg rest is pushed back so far that the tooth 71 engages the straight sided notch of the disc 64, it will return to the raised position under the action of the spring 68 as soon as the excessive weight is removed.

The foot rest 30 has a transverse, horizontal member 76 constituted by a bent sheet metal profile and presenting the foot rest proper. Integrally connected with the ends of the member 76 are arms 77 in the form of flanged channels which have secured to one of their side walls a tooth rack 78 and slide in box sectional structures 79 integrally secured to the leg rest structure 57. The racks 78 are engaged each by a pinion 80 non-rotatably secured to the end of a transverse shaft 81, which latter is rotatably supported in bearings 82 of the leg support. A coil spring surrounding and engaging by one of its ends the shaft 81 engages by its other end the leg rest structure 57 and is so pre-tensioned that it endeavors to pull the foot rest inwardly by rotating the shaft 81.

For holding the foot rest in different desired positions, pawls 84 are provided, one on each side, and keyed to the ends of a second shaft 85. This shaft, furthermore, has keyed to it a lever 86 engaged by the tension spring 87 and journalled to rod 88 provided with a handle 89 and guided in bracket 90 to permit the retraction of the pawls 84 out of engagement with the racks 78, thereby permitting the movement of the foot rest to a new position of adjustment.

91 are stops secured to the leg rest members 79 which engage removable transverse pins 92 of the foot rest member 77 to limit the outward movement of the foot rest. The support and the construction of the foot rest and the adjusting mechanism therefor which have been described so far differ but slightly from those disclosed in the above earlier applications.

A feature by which the present invention differs materially from said earlier applications resides in the brackets 93 secured to the under or rear side of the foot rest near both ends thereof. These brackets 93 carry rotatable rollers or wheels 94 which keep the foot rest proper out of contact with the floor and roll along the floor. Furthermore, these brackets 93 with their rollers 94 support the leg rest and the foot rest when the foot rest is in the forwardly extended position, as shown in Figure 2 by a dot-and-dash line. This, too, contributes to the safe support of leg and foot rest without danger of damage or breakage due to overloading. When the leg and foot rest are in about vertical position or swung backwardly toward the seat, the rollers 94 come out of contact with the floor and the gliding on the floor is taken over by marginal, well-rounded, curved brackets or runners 95 (Figure 6).

The embodiment illustrated in Figures 9 to 11 differs from the first described and illustrated embodiment merely in the construction of the foot rest, so that for corresponding parts the same reference numerals are used in Figure 9 as in the preceding figures, and no details are shown and described except those which are specific for the second embodiment. The foot rest unit 30 has two arms 77 which may be identically formed and supported in the leg rest 29 as in the preceding embodiment.

The outer ends of the members 77 are each integrally connected, as by welding, to form pieces 96 which have coaxial, cylindrical portions 97. The inner ends of the latter are rigidly interconnected by a tube 98 integrally provided with a pair of brackets 99 carrying a rotatable, elongated roller 100. The brackets 99 and the roller 100 serve for the same purpose as the brackets 93 and wheels 94 of the first embodiment. However, the greater length of the brackets 99 allows a higher support of the leg-and-foot rest and the elongated roller 100 is better adapted for use in connection with a soft floor covering, such as a carpet.

The foot rest proper consists of a transverse member 101 integrally connected with end members 102 and sleeves 103, which latter surround and are rotatably supported by the cylindrical extensions 97 between the ends of the tube 98 and the outer portions of the members 96. For holding the foot rest in operative position, as shown in full lines in Figures 9 to 11, the end members 102 are provided each with a projection 104 which engages on its side a stop 105 integral with the members 77, 96.

To shorten the combined length of foot and leg rest for the retracted position, the foot rest may be swung upwardly and backwardly into the position against the leg rest shown by dot-and-dash lines in Figure 9. To hold the foot rest in this position and also to hold it firmly in the operative position, two radial holes 106 and 107 are provided in each of the cylindrical members 97, and the foot rest carries on each end a leaf spring 108 provided with a projecting knob 109 which resiliently engages one of said borings but on account of its conical shape gives way if the foot rest is forcibly swung about the supporting shafts 97.

It will be understood that, if desired, the foot rest may be employed also in the position in which it is folded backwardly to accommodate an occupant's short legs, for instance a child's legs. Moreover, the roller 100 with its supporting brackets 99 may be swingably attached in a manner similar to the attachment of the leg rest so that in the one position, the position illustrated in the drawing, the extended foot rest is supported at a relatively great height above the floor, whereas in another somewhat rearwardly extended position the roller supports the leg rest at a lower level.

To insure smooth gliding of the foot rest on the floor when the roller 100 comes out of engagement with the floor, the end members 102 are provided with well-rounded heels or extensions 110 which have the same function as the runners 95 of the first embodiment.

The invention is not restricted to the illustrated embodiments, indeed, the illustration and description of three different embodiments clearly indicates that the invention is liable to many modifications within the limits defined by the spirit and the language of the attached claims.

What is claimed is:

1. In a seat having a seat frame structure and a leg rest attached to said structure swingably about a horizontal axis, a member rigidly connected with said leg rest and provided with notches on its outer circumference, a pawl resiliently supported by said structure to engage one of said notches at a time, said pawl and said notches being arranged so that one notch is engaged in the downwardly folded position of the leg rest and another is engaged when the leg rest is in a forwardly and upwardly swung position, said last-named notch having an inclined wall with the effect that it will push the pawl back and permit the leg rest to fold down if excessive weight is placed on the latter.

2. In a seat having a leg rest journalled swingably about a generally horizontal axis to its front margin and having the leg rest provided with an extensible foot rest, brackets on said foot rest provided with at least one roller to hold the leg rest above the floor when it is in extended position and the leg rest is swung forwardly, said roller permitting rolling movement of the extension over the floor when the leg rest is swung forwardly or backwardly and the foot rest is simultaneously extended or retracted so that the roller remains in contact with the floor, and additional projecting portions on the foot rest glidingly engaging the floor when in the nearly vertical position of the leg and foot rests the roller becomes disengaged from the floor.

MICHAEL WATTER.

REFERENCES CITED

The following references are of record in the file of this patent:

UNITED STATES PATENTS

| Number | Name | Date |
|---|---|---|
| 101,681 | Towle | Apr. 5, 1870 |
| 134,733 | Collins | Jan. 14, 1873 |
| 156,004 | Wayland | Oct. 14, 1874 |
| 156,772 | Collins | Nov. 10, 1874 |
| 177,050 | Wood | May 2, 1876 |
| 215,047 | Crisp | May 6, 1879 |
| 1,067,914 | Giasson | July 22, 1913 |
| 1,190,523 | Dodd | July 11, 1913 |
| 1,472,272 | Heck | Jan. 7, 1921 |
| 1,586,740 | Heck | June 1, 1926 |
| 2,093,455 | Knight | Sept. 21, 1937 |
| 2,174,622 | Dale | Oct. 3, 1939 |

FOREIGN PATENTS

| Number | Country | Date |
|---|---|---|
| 407,014 | Germany | Jan. 12, 1926 |